(12) United States Patent
Vijayan et al.

(10) Patent No.: US 12,299,310 B2
(45) Date of Patent: *May 13, 2025

(54) METHODS AND SYSTEMS TO INTERFACE BETWEEN A MULTI-SITE DISTRIBUTED STORAGE SYSTEM AND AN EXTERNAL MEDIATOR TO EFFICIENTLY PROCESS EVENTS RELATED TO CONTINUITY

(71) Applicant: NetApp, Inc., San Jose, CA (US)

(72) Inventors: Anoop Vijayan, Karnataka (IN); Akhil Kaushik, San Jose, CA (US); Sohan Shetty, Bangalore (IN); Dhruvil Shah, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,911

(22) Filed: Feb. 1, 2024

(65) Prior Publication Data
US 2024/0168673 A1     May 23, 2024

Related U.S. Application Data

(63) Continuation of application No. 17/970,961, filed on Oct. 21, 2022, now Pat. No. 11,893,264, which is a
(Continued)

(51) Int. Cl.
*G06F 3/00*     (2006.01)
*G06F 3/06*     (2006.01)

(52) U.S. Cl.
CPC ............ *G06F 3/065* (2013.01); *G06F 3/0604* (2013.01); *G06F 3/0629* (2013.01); *G06F 3/0641* (2013.01); *G06F 3/067* (2013.01)

(58) Field of Classification Search
None
See application file for complete search history.

(56) References Cited

U.S. PATENT DOCUMENTS 5,504,861 A * 4/1996 Crockett ............. G06F 11/2064
                                                        714/E11.107
5,742,792 A    4/1998 Yanai et al.
(Continued)

OTHER PUBLICATIONS

Non-Final Office Action mailed Jan. 17, 2023 for U.S. Appl. No. 17/881,381, filed Aug. 4, 2022, 18 pages.
(Continued)

*Primary Examiner* — Midys Rojas
(74) *Attorney, Agent, or Firm* — Jaffery Watson Hamilton & DeSanctis LLP

(57) ABSTRACT

Systems and methods are described for efficiently processing events related to a relationship between a primary copy of data at a primary storage system and a mirror copy of the data at a cross-site secondary storage system of a multi-site distributed storage system. According to an example, a mediator agent that is configured on both primary and secondary storage systems provides coordination and serialization for various events generated in the relationship. The multi-site distributed storage system performs actions based on the event processing such as performing a failover operation from the primary storage system to the secondary storage system or resynchronizing the relationship to ensure application protection and availability.

20 Claims, 8 Drawing Sheets

Related U.S. Application Data continuation of application No. 17/219,816, filed on Mar. 31, 2021, now Pat. No. 11,481,139.

(56) References Cited

U.S. PATENT DOCUMENTS

| | | |
|---|---|---|
| 6,389,551 B1 | 5/2002 | Yount |
| 6,415,372 B1 | 7/2002 | Zakai et al. |
| 7,039,827 B2 | 5/2006 | Meyer et al. |
| 7,500,014 B1 | 3/2009 | Jacobson et al. |
| 7,631,066 B1 | 12/2009 | Schatz et al. |
| 7,640,451 B2 | 12/2009 | Meyer et al. |
| 7,644,305 B2 | 1/2010 | Friedrich et al. |
| 7,890,626 B1 | 2/2011 | Gadir |
| 8,498,967 B1 | 7/2013 | Chatterjee et al. |
| 8,645,623 B1 | 2/2014 | O'Shea et al. |
| 8,856,583 B1 | 10/2014 | Visser et al. |
| 8,874,960 B1 | 10/2014 | Khan et al. |
| 9,189,341 B1 | 11/2015 | Natanzon et al. |
| 10,412,066 B1 | 9/2019 | Vemuri |
| 10,496,320 B2 | 12/2019 | Eisler et al. |
| 10,725,691 B1 | 7/2020 | Kaushik et al. |
| 10,761,768 B1 | 9/2020 | Kaushik et al. |
| 11,036,423 B2 | 6/2021 | Kaushik et al. |
| 11,089,105 B1 | 8/2021 | Karumbunathan et al. |
| 11,327,857 B2 | 5/2022 | Bhargava et al. |
| 11,360,867 B1 | 6/2022 | Subramanian et al. |
| 11,409,622 B1 | 8/2022 | Kaushik et al. |
| 11,481,139 B1 | 10/2022 | Vijayan et al. |
| 11,550,679 B2 | 1/2023 | Kaushik et al. |
| 2002/0132613 A1 | 9/2002 | Leung et al. |
| 2004/0153719 A1 | 8/2004 | Achiwa et al. |
| 2005/0229034 A1 | 10/2005 | Fujibayashi |
| 2006/0236048 A1 | 10/2006 | Deguchi et al. |
| 2007/0180307 A1 | 8/2007 | Zohar et al. |
| 2007/0234006 A1 | 10/2007 | Radulescu et al. |
| 2008/0201702 A1 | 8/2008 | Bunn |
| 2009/0043979 A1 | 2/2009 | Jarvis |
| 2009/0089609 A1 | 4/2009 | Baba |
| 2009/0307530 A1 | 12/2009 | Tarta |
| 2010/0064168 A1 | 3/2010 | Smoot et al. |
| 2010/0082962 A1 | 4/2010 | Srinivasan et al. |
| 2010/0161554 A1 | 6/2010 | Datuashvili et al. |
| 2011/0106855 A1 | 5/2011 | Resch et al. |
| 2011/0314148 A1 | 12/2011 | Petersen et al. |
| 2012/0151249 A1 | 6/2012 | Swan et al. |
| 2014/0298136 A1 | 10/2014 | Resch et al. |
| 2015/0006949 A1 | 1/2015 | Bittles et al. |
| 2015/0058838 A1 | 2/2015 | Tsirkin |
| 2015/0378767 A1 | 12/2015 | Tarasuk-Levin et al. |
| 2016/0063083 A1 | 3/2016 | Mu et al. |
| 2016/0366226 A1 | 12/2016 | Friedman et al. |
| 2017/0093983 A1 | 3/2017 | Everhart et al. |
| 2018/0260125 A1 | 9/2018 | Botes et al. |
| 2018/0352032 A1 | 12/2018 | Liu et al. |
| 2019/0004908 A1 | 1/2019 | Gopinath et al. |
| 2019/0034286 A1 | 1/2019 | Brown et al. |
| 2019/0229978 A1 | 7/2019 | Rajvaidya et al. |
| 2019/0347352 A1 | 11/2019 | Gochkov et al. |
| 2019/0394266 A1 | 12/2019 | Fukuyama et al. |
| 2020/0034258 A1 | 1/2020 | Avraham et al. |
| 2020/0050495 A1 | 2/2020 | Voutilainen et al. |
| 2020/0050587 A1 | 2/2020 | Kaushik et al. |
| 2020/0125460 A1 | 4/2020 | Selvaraj et al. |
| 2020/0133520 A1 | 4/2020 | Patnaik et al. |
| 2020/0273984 A1 | 8/2020 | Nakano et al. |
| 2020/0278984 A1 | 9/2020 | Kaushik et al. |
| 2020/0319982 A1 | 10/2020 | Rusev et al. |
| 2021/0303165 A1 | 9/2021 | Kaushik et al. |
| 2021/0374157 A1 | 12/2021 | Reddy et al. |
| 2022/0019350 A1 | 1/2022 | Karr |
| 2022/0121533 A1 | 4/2022 | Kumar et al. |
| 2022/0317896 A1 | 10/2022 | Valan et al. |
| 2022/0317897 A1 | 10/2022 | Subramanian et al. |
| 2022/0318105 A1 | 10/2022 | Subramanian et al. |
| 2022/0374321 A1 | 11/2022 | Kaushik et al. |
| 2023/0119175 A1 | 4/2023 | Kaushik et al. |
| 2024/0012575 A1 | 1/2024 | Narasingarayanapeta et al. |

OTHER PUBLICATIONS

Non-Final Office Action mailed on Apr. 13, 2023 for U.S. Appl. No. 18/066,775, filed Dec. 15, 2022, 16 pages.
Non-Final Office Action mailed on Mar. 16, 2023 for U.S. Appl. No. 17/970,961, filed Oct. 21, 2022, 6 pages.
Notice of Allowance mailed Dec. 13, 2022 for U.S. Appl. No. 17/219,815, filed Mar. 31, 2021.
Notice of Allowance mailed Nov. 18, 2022 for U.S. Appl. No. 17/219,812, filed Mar. 31, 2021, 12 pages.
Notice of Allowance mailed Oct. 31, 2022 for U.S. Appl. No. 17/219,812, filed Mar. 31, 2021, 9 pages.
Notice of Allowance mailed on Apr. 7, 2023 for U.S. Appl. No. 17/219,740, filed Mar. 31, 2021, 7 pages.
Notice of Allowance mailed on Aug. 2, 2023 for U.S. Appl. No. 17/970,961, filed Oct. 21, 2022, 07 pages.
Notice of Allowance mailed on Aug. 28, 2023 for U.S. Appl. No. 17/970,961, filed Oct. 21, 2022, 5 pages.
Notice of Allowance mailed on Jun. 9, 2023 for U.S. Appl. No. 17/881,381, filed Aug. 4, 2022, 2 pages.
Notice of Allowance mailed on Mar. 3, 2023 for U.S. Appl. No. 17/219,815, filed Mar. 31, 2021, 5 pages.
Notice of Allowance mailed on Mar. 20, 2023 for U.S. Appl. No. 17/219,740, filed Mar. 31, 2021, 11 pages.
Notice of Allowance mailed on May 24, 2023 for U.S. Appl. No. 17/881,381, filed Aug. 4, 2022, 8 pages.
Pan L, "Paxos at Its Heart is Very Simple," Distributed System, 2018, Retrieved From : URL: https://blog.the-pans.com/paxos-explained/, pp. 1-12.
U.S. Non-Final Office action dated Dec. 21, 2021 in U.S. Appl. No. 17/238,829, filed Apr. 23, 2021, 20 pages.
U.S. Notice of Allowance dated Apr. 6, 2022 in U.S. Appl. No. 17/238,829, filed Apr. 23, 2021, 9 pages.
U.S. Notice of Allowance mailed Jun. 24, 2022 in U.S. Appl. No. 17/219,816, filed Mar. 31, 2021, 8 pages.
U.S. Notice of Allowance mailed May 6, 2022 in U.S. Appl. No. 17/219,746, filed Mar. 31, 2021, 18 pages.
U.S. Notice of Allowance mailed Oct. 26, 2022 in U.S. Appl. No. 17/219,812, filed Mar. 31, 2021, 9 pages.

* cited by examiner

METHODS AND SYSTEMS TO INTERFACE BETWEEN A MULTI-SITE DISTRIBUTED STORAGE SYSTEM AND AN EXTERNAL MEDIATOR TO EFFICIENTLY PROCESS EVENTS RELATED TO CONTINUITY

RELATED APPLICATIONS

This application is a continuation of U.S. Pat. No. 17,970,961, filed Oct. 21, 2022, which is a continuation of U.S. patent application Ser. No. 17/219,816, filed Mar. 31, 2021, now U.S. Pat. No. 11,481,139, both of which are hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2021, NetApp, Inc.

FIELD

Various embodiments of the present disclosure generally relate to multi-site distributed data storage systems. In particular, some embodiments relate to improving system operation and user experience based on interfacing with peer storage cluster and external mediator to efficiently process events related to business continuity.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. A secondary cluster can replicate data at a primary cluster. The storage nodes within a cluster may generate systemic events for a continuity relationship between the primary and secondary copies of the data. Multiple events can be generated simultaneously. A lack of coordination in processing these events can lead to data corruption.

SUMMARY

Systems and methods are described for efficiently processing events related to a continuity relationship between a primary copy of data at a primary storage system and a mirror copy of the data at a cross-site secondary storage system of a multi-site distributed storage system. According to an example, a mediator agent that is configured on both primary and secondary storage systems provides coordination and serialization for various events generated in the continuity relationship. The multi-site distributed storage system performs actions based on the event processing such as performing a failover operation from the primary storage system to the secondary storage system or resynchronizing the continuity relationship to ensure application protection and availability.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
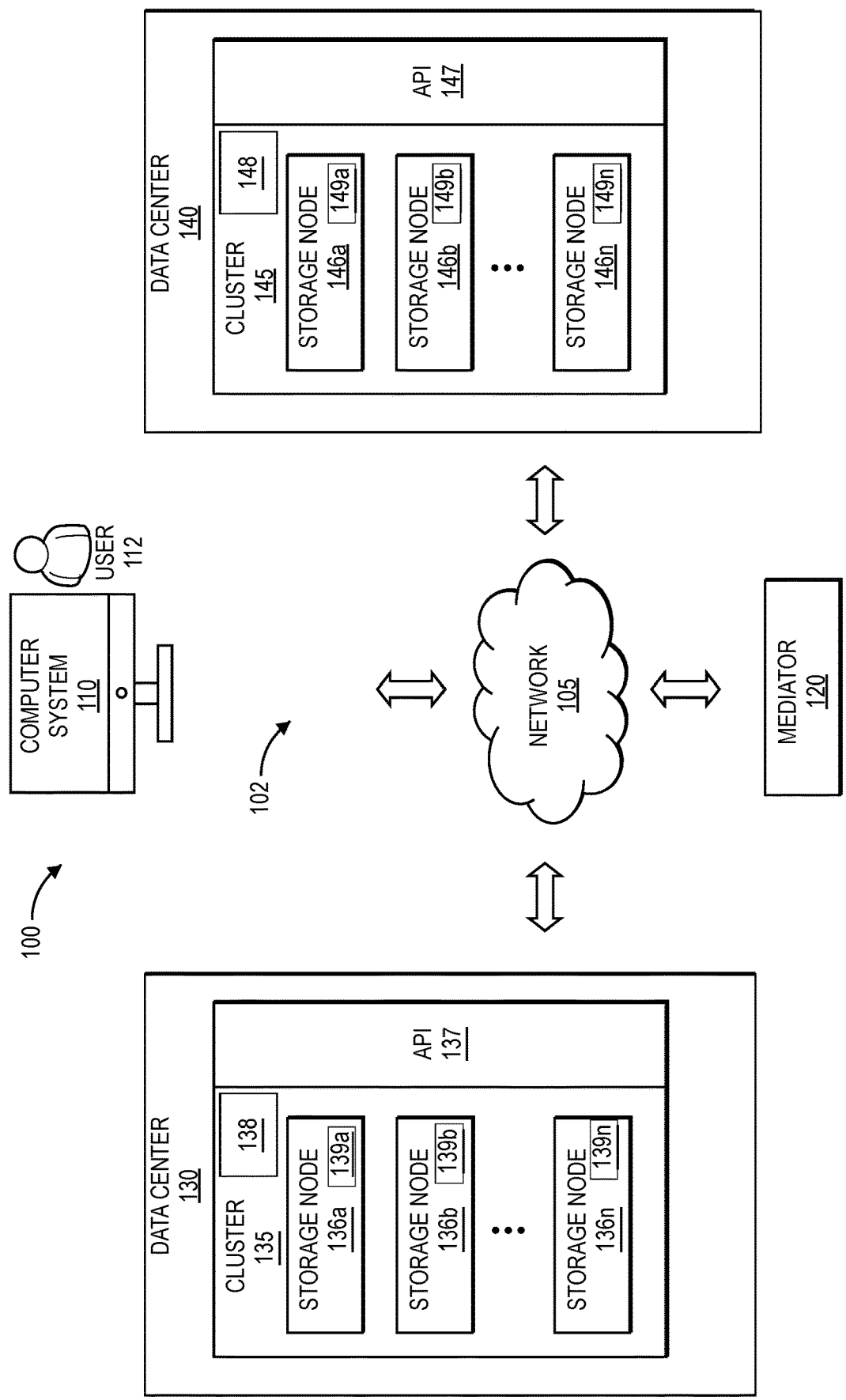
FIG. 1 is a block diagram illustrating an environment in which various embodiments may be implemented.

Multi-site distributed storage systems and computer-implemented methods are described for providing consistent and optimal processing of lifecycle and systemic events for a relationship (e.g., a continuity relationship) between a primary storage system and a secondary storage system.

A set of data containers or volumes on a primary storage cluster of a multi-site distributed storage system are grouped together to form a consistency group (CG), which is synchronously replicated to a secondary storage cluster. The primary storage cluster serves input/output (I/O) operations to a host or client application. Upon a failure of the primary storage cluster, a business continuity failover gets automatically triggered and the application can seamlessly access a secondary copy of data from the secondary storage cluster and continue services for the application.

An external mediator module is provisioned in a third site and configured on both storage clusters to act as an arbitrator towards handling of split brain scenarios and other failure cases including site failures. Business continuity lifecycle operations and zero RPO protection is provided with and without a mediator. In the presence of a mediator, mediator state is updated with a state of the CG state—so as to enable failover operations. However, in case of mediator unavailability (transient or persistent), these business continuity lifecycle operations are allowed and the zero RPO protection is not impacted.

For a multi-site distributed storage system, both lifecycle operations and zero recovery point objective (RPO) protection related events (e.g., out of synchronization (OOS)) transition between primary and secondary clusters, in sync transition between primary and secondary clusters) need to be coordinated between the primary and secondary clusters. A mediator agent or tiebreaker agent is a user-space module that is present on the primary and secondary clusters to provide the coordination and serialization for lifecycle operations and zero RPO protection related events. The multi-site distributed storage system then performs actions based on the event processing like performing a failover or resynchronizing the relationship between primary and secondary cluster to ensure application protection and availability.

The mediator agent improves functionality and efficiency of the multi-site distributed storage system by providing consistent and optimal processing of lifecycle and systemic events for multiple consistency groups. The mediator agent ensures that all volumes of a particular CG obtain consistent results while processing a particular event.

A CG could consist of multiple volumes or data containers which could be spread across different data aggregates on the same node or even across different nodes in a cluster. If different constituents or volumes of the CG obtain different results while processing a particular event, it will lead to inconsistency. For example, when the continuity relationship proceeds to Out Of Sync (OOS) due to a failure, all volumes generate an OOS event. The expected outcome from event processing is designed to be atomic with either all volumes obtaining the consensus or none obtaining the consensus to serve application I/O operations.

To maintain consistency, the mediator agent deduplicates events from all volumes within a CG and performs the processing of the duplicative event once. The duplicated events are terminated to avoid using additional processing for events that will generate a same result or outcome in comparison to the processed event. The multi-site distributed storage system upon obtaining an output of the processed event, will persistently cache this output in a configuration database of a cluster. The deduplication improves efficiency by avoiding multiple round-trips to an external mediator that is located at a third site.

In one embodiment, cross-site high availability is a valuable addition to cross-site zero recover point objective (RPO) that provides non-disruptive operations based on a seamless failing over of storage access to a mirror copy hosted in a remote data center, even if the entire local data center becomes non-functional. This type of failover is also known as zero RTO, near zero RTO, or automatic failover. A cross-site high availability storage when deployed with host clustering enables workloads to be in both data centers.

A multi-site distributed storage system uses an external mediator to avoid split-brain and perform automatic failover in case the site hosting the primary copy is isolated or lost. For all other business continuity lifecycle operations, an external mediator availability is not needed. For example, the continuity relationship can become OOS and then return to in sync even if the mediator is not provisioned or not reachable. The present design will maintain zero RPO for the mirror copy of the date and if needed a failover can be performed to achieve zero data loss.

Also, if a resync operation depends upon the external mediator, the resync operation will be deferred until the mediator is available and this cause a longer time period for returning the relationship in sync due to prolonged data churn for a master. Thus, the present design ensures zero RPO protection and provides a consistent outcome for various lifecycle events and failure cases even when the mediator is unavailable.

A cross-site high availability multi-site storage system of the present design provides semantics and consistent outcome to handle lifecycle operations and events generated due to failures. Given that more workloads are moving to a cloud environment and many customers deploy hybrid cloud, applications will also demand these same features in the cloud including cross-site high availability, planned failover, planned migration, etc.

As such, embodiments described herein seek to improve the technological processes of multi-site distributed data storage systems. Various embodiments of the present technology provide for a wide range of technical effects, advantages, and/or improvements to multi-site distributed storage systems and components. For example, various embodiments may include one or more of the following technical effects, advantages, and/or improvements: (i) lifecycle operations and zero RPO protection is not affected due to mediator unavailability; and (ii) efficiency and consistency when dealing with same event generated by all constituents with time delays caused to system behavior.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120.

Turning now to the cluster 135, it includes a configuration database 138, multiple storage nodes 136a-n each having a respective mediator agent 139a-n, and an Application Programming Interface (API) 137. In the context of the present example, the multiple storage nodes 136a-n are organized as a cluster and provide a distributed storage architecture to service storage requests issued by one or more clients (not shown) of the cluster. The configuration database may store configuration information for a cluster. A configuration database provides cluster wide storage for storage nodes within a cluster. The data served by the storage nodes 136a-n may be distributed across multiple storage units embodied as persistent storage devices, including but not limited to HDDs, SSDs, flash memory systems, or other storage devices. In a similar manner, cluster 145 includes a configuration database 148, multiple storage nodes 146a-n each having a respective mediator agent 149a-n, and an Application Programming Interface (API) 147. In the context of the present example, the multiple storage nodes 146a-n are organized as a cluster and provide a distributed storage architecture to service storage requests issued by one or more clients of the cluster.

According to an example, a mediator agent (e.g., 139a-139n, 149a-149n) that is configured on both clusters provides coordination and serialization for various events generated in the continuity relationship. The events may be related to lifecycle of the continuity relationship or systemic events related to storage nodes or network conditions. A lifecycle event may proceed through different stages (e.g., new event, acknowledged event, resolved event, repaired or fixed issue is marked as obsolete). Multiple events can be generated simultaneously by different nodes. For example, storage nodes 136a, 136b, 146a, and 146b may simultaneously or nearly simultaneously generate a same event. The mediator agent provides coordination and serialization for the simultaneous generation of the same event numerous times and ensures consistent processing of the simultaneous events.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions.

Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
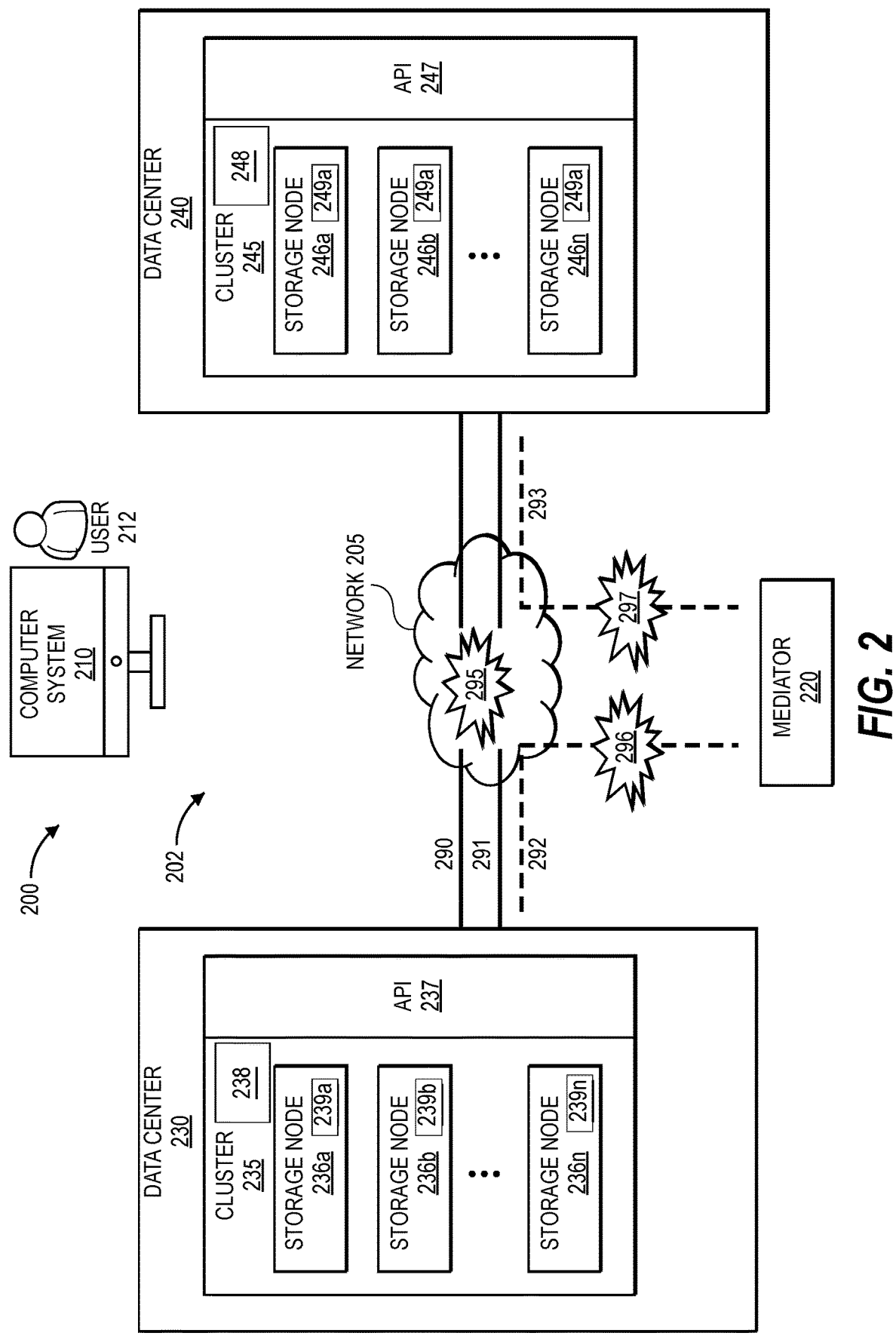
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times, even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes a configuration database 238, at least two storage nodes 236a-b, optionally includes additional storage nodes (e.g., 236n) and an Application Programming Interface (API) 237. The storage nodes 236a-n each include a respective mediator agent 239a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes a configuration database 248, at least two storage nodes 246a-b, optionally includes additional storage nodes (e.g., 246n) and includes an Application Programming Interface (API) 247. The storage nodes 246a-n each include a respective mediator agent 249a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 consistency groups with each consistency group having up to 12 volumes. The mediator agent provides coordination and serialization for various events (e.g., simultaneous events, conflicting events) generated in a business continuity relationship between each cluster. The mediator agents are configured on each node within a cluster. The system 202 can perform appropriate actions based on event processing like performing a failover from a primary copy of the data center 230 to a mirror copy of the data center 240 or vice versa. The system 202 can also resynchronise the relationship to ensure application protection and availability.

Figure 3:
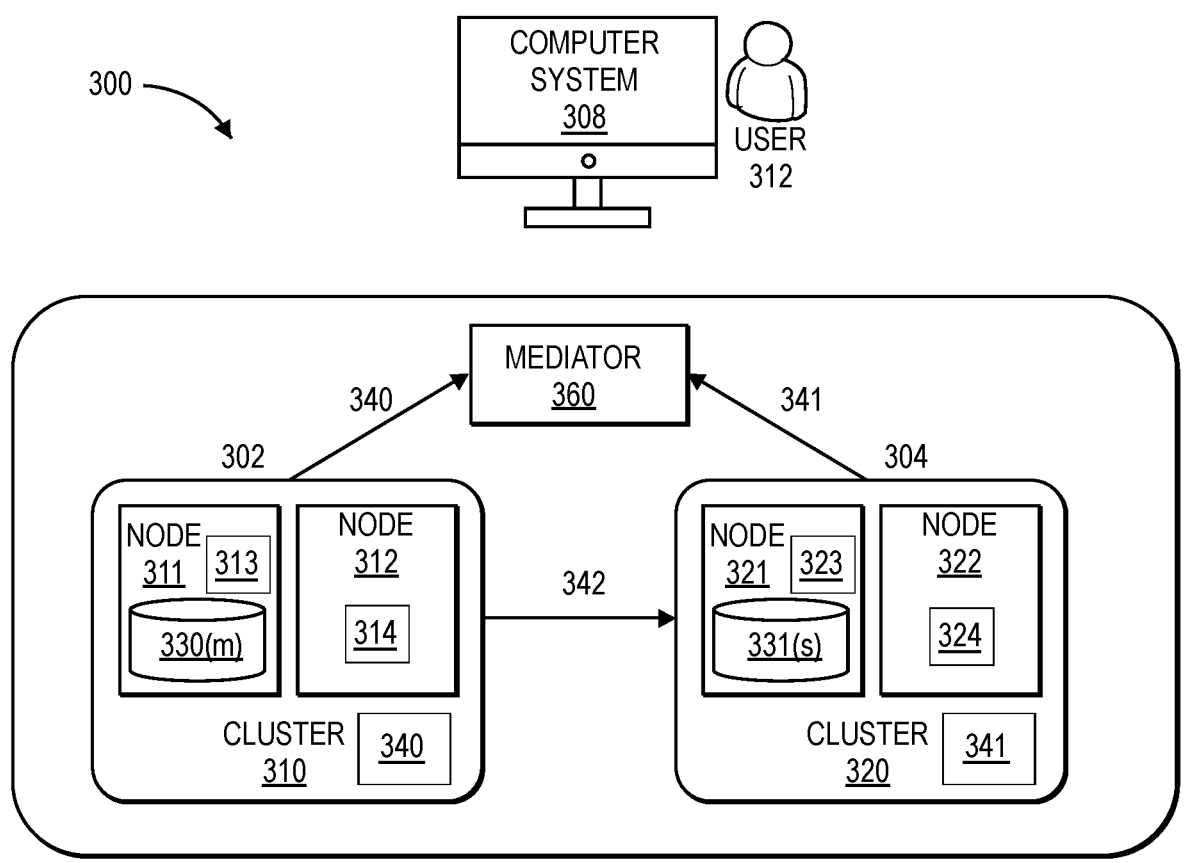
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 312) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the node 311 is designated as a master and the node 321 is designated as a slave. The master is given preference to serve I/O operations to requesting clients and this allows the master to obtain a consensus in a case of a race between the clusters 310 and 320.

The mediator agents (e.g., 313, 314, 323, 324) are configured on each node within a cluster. The system 300 can perform appropriate actions based on event processing of the mediator agents. The mediator agent(s) processes events that are generated at a lower level (e.g., volume level, node level) and generates an output for a consistency group level. In one example, the nodes 311, 312, 321, and 322 for a consistency group. The mediator agent provides coordination and serialization for various events (e.g., simultaneous events, conflicting events) generated in a business continuity relationship between each cluster.

The master and slave roles for the clusters 310 and 320 help to avoid a split-brain situation with both of the clusters simultaneously attempting to serve I/O operations. There are scenarios where both master and slave copies can claim to be a master copy. For example, if a failover rollback timer is started for the master and a slave is required to perform a role change from being a slave to being a master, then this role change event is stored in a queue of a configuration database (e.g., 340, 341). A mediator agent processes the role change to the slave at the CG level and this causes the rollback on the master to not be processed. In other words, the master is not able to serve I/O operations due to the slave being changed to the master role.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) operations with a host computer, as defined by the Small System Computer Interface (SCSI) standard. In one example, active or passive access to this virtual LUN causes read and write operations to be serviced only by node 311 (master) while operations received by the node 321 (slave) are proxied to node 311.

Example Storage Node

Figure 4:
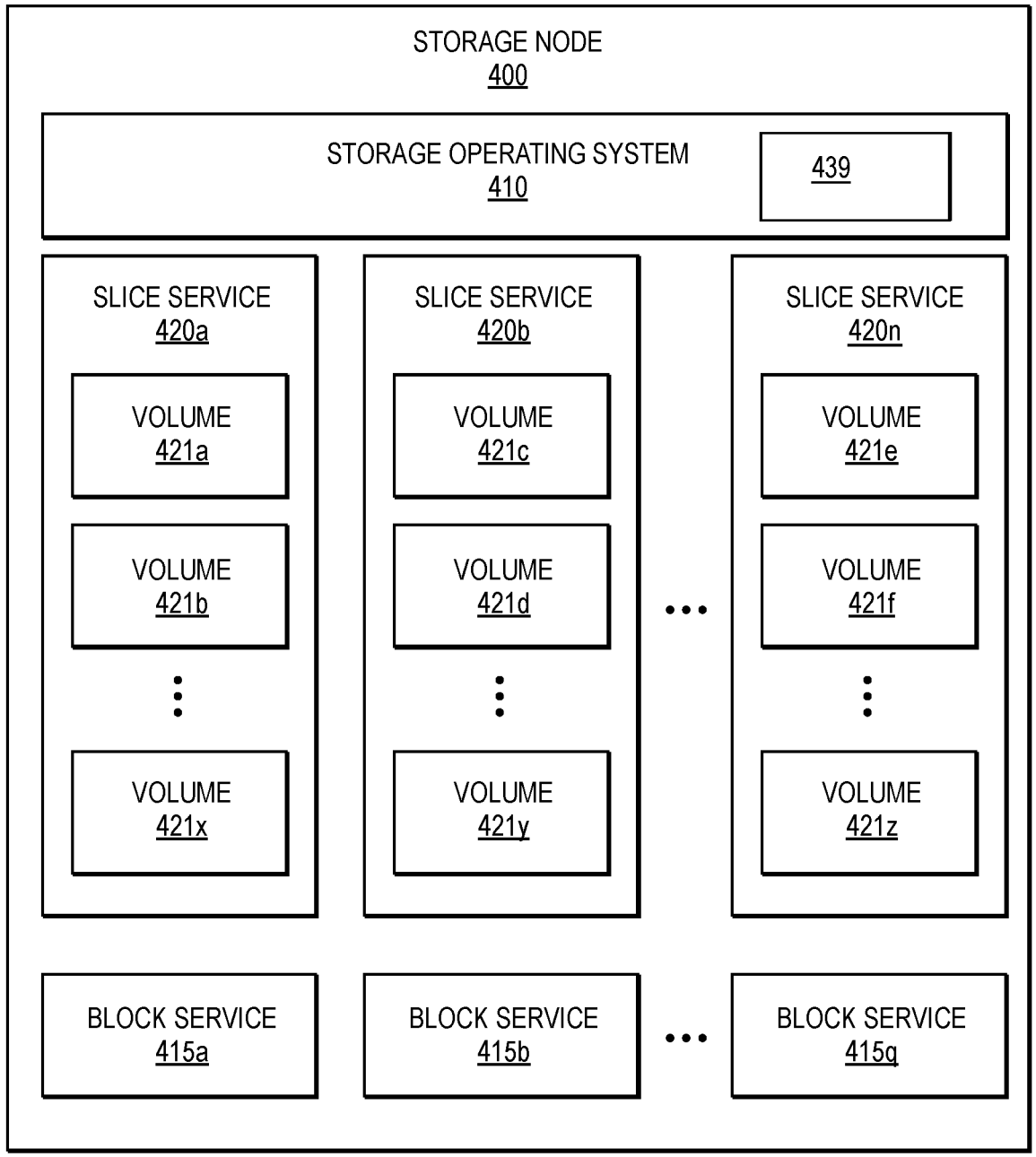
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 321, 322, 710, 720) described herein. In the context of the present example, a storage node 400 may be a network storage controller or controller that provides access to data stored on one or more volumes. The storage node 400 includes a storage operating system 410, a mediator agent 439, one or more slice services 420a-n, and one or more block services 415a-q. The mediator agent 439 can be separate or integrated with the storage operating system 410. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Figure 5:
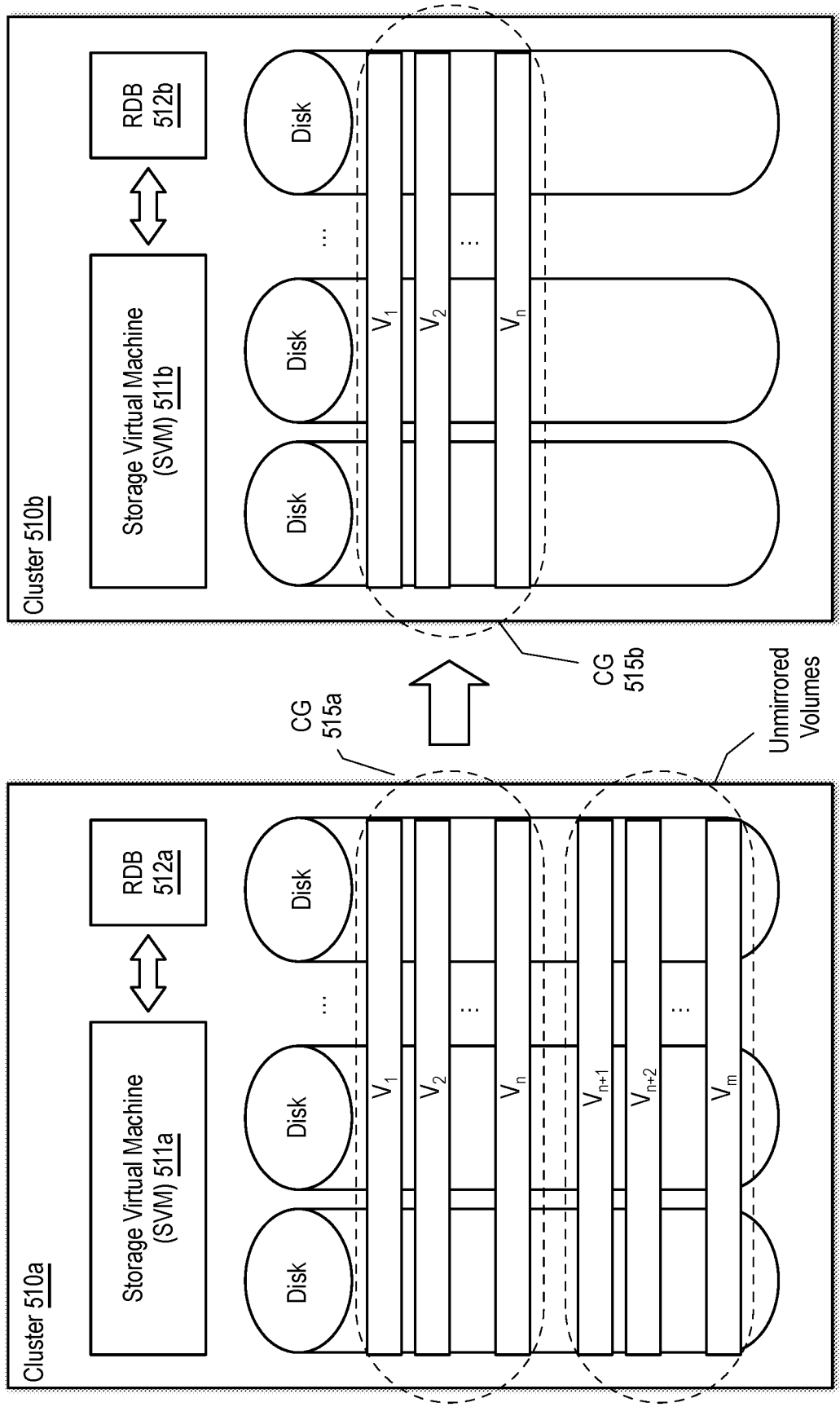
FIG. 5 is a block diagram illustrating the concept of a consistency group (CG) in accordance with an embodiment.

FIG. 5 is a block diagram illustrating the concept of a consistency group (CG) in accordance with an embodiment. In the context of the present example, a stretch cluster including two clusters (e.g., cluster 510a and 510b) is shown. The clusters may be part of a cross-site high-availability (HA) solution that supports zero recovery point objective (RPO) and zero recovery time objective (RTO) by, among other things, providing a mirror copy of a dataset at a remote location, which is typically in a different fault domain than the location at which the dataset is hosted. For example, cluster 510a may be operable within a first site (e.g., a local data center) and cluster 510b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, consistent processing of events, failover, and the like) may be performed at the level of granularity of a CG (e.g., CG 515a or CG 515b). A CG is a collection of storage objects or data containers (e.g., volumes) within a cluster that are managed by a Storage Virtual Machine (e.g., SVM 511a or SVM 511b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515a may be referred to as a local CG from the perspective of cluster 510a and as a remote CG from the perspective of cluster 510b. Similarly, CG 515a may be referred to as a remote CG from the perspective of cluster 510b and as a local CG from the perspective of cluster 510b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512a and 512b), which may store configuration information for their respective clusters. A configuration database provides cluster wide storage for storage nodes within a cluster. The configuration information may include relationship information (e.g., relationship information of a continuity relationship) specifying the status (e.g., OOS status, in sync status), direction of data replication, relationships, and/or roles of individual CGs, a set of CGs, members of the CGs, and/or the mediator. A pair of CGs may be said to be "peered" when one is protecting the other. For example, a CG (e.g., CG 115b) to which data is configured to be synchronously replicated may be referred to as being in the role of a destination CG, whereas the CG (e.g., CG 515a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a consistency group may be described as performing certain actions (e.g., generating or receiving events (e.g., out of sync event), taking other members of a consistency group out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (master) cluster is stored on more than one secondary (slave) cluster.

Figure 6:
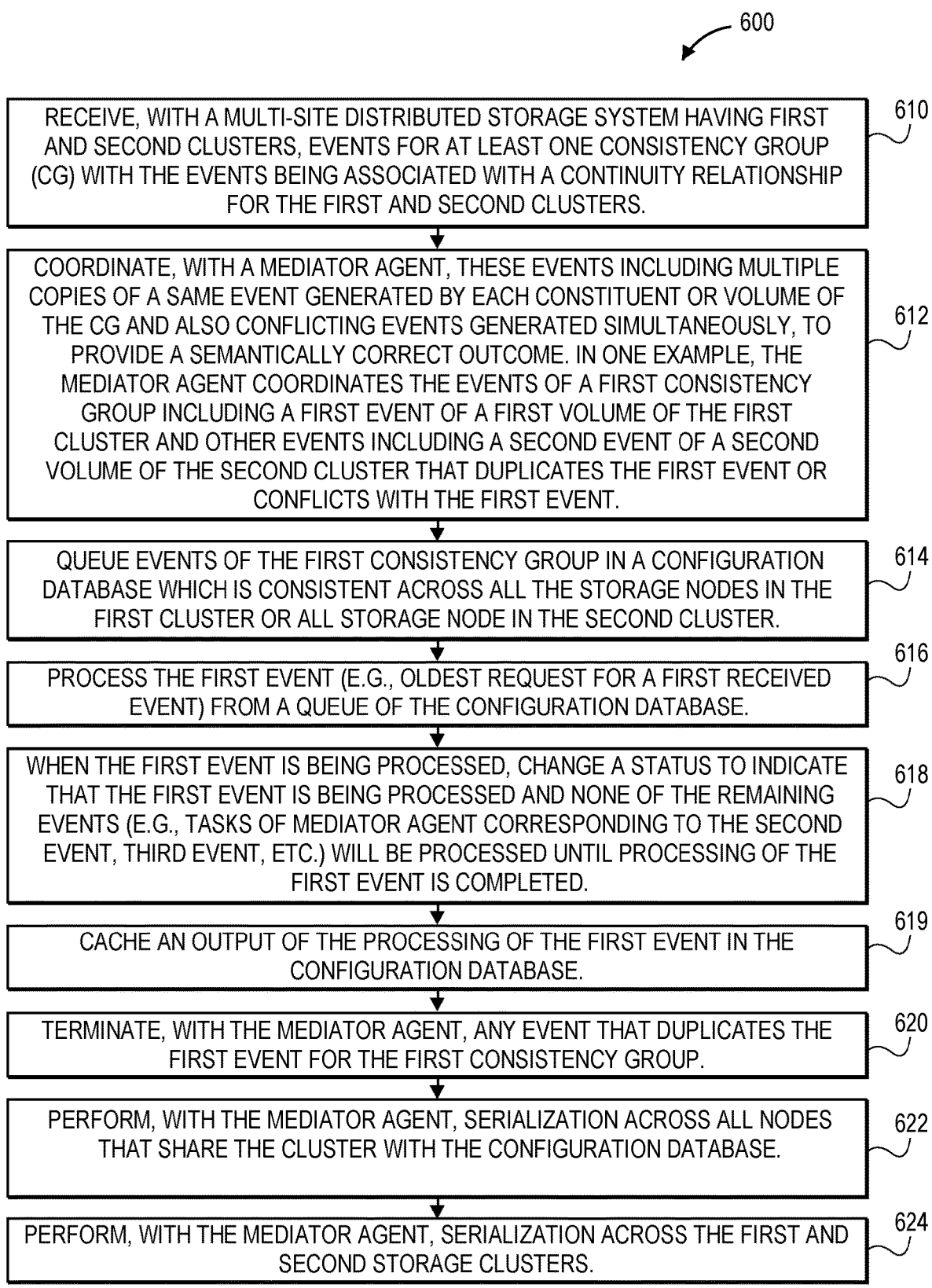
FIG. 6 is a flow diagram illustrating a computer-implemented method 600 of operations of a mediator agent that provides coordination and serialization for various events generating in a continuity relationship (e.g., synchronous replication continuity relationship) in accordance with an embodiment of the present disclosure.

FIG. 6 is a flow diagram illustrating a computer-implemented method 600 of operations of a mediator agent that provides coordination and serialization for various events generating in a continuity relationship (e.g., a synchronous replication continuity relationship, a relationship) in accordance with an embodiment of the present disclosure. As noted above, this mediator agent provides consistent and optimal processing of business continuity lifecycle and systemic events of storage nodes for multiple consistency groups. The events may relate to transient or persistent network connectivity issues, availability/unavailability of the mediator, site failure, and the like. The mediator agent also avoids a split-brain situation by the way of a strong consensus (e.g., strong consensus in a PAXOS instance) based on having a primary copy of a first data center, a mirror copy with a second data center, and a mediator at a third site.

Although the operations in the computer-implemented method 600 are shown in a particular order, the order of the actions can be modified. Thus, the illustrated embodiments can be performed in a different order, and some operations may be performed in parallel. Some of the operations listed in FIG. 6 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 600 may be executed by a storage controller, a storage virtual machine (e.g., SVM 511a, SVM 511b), a mediator (e.g., mediator 120, mediator 220, mediator 360), a multi-site distributed storage system, a mediator agent configured on each cluster of a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a generalpurpose computer system or a dedicated machine or a device), or a combination of both.

In one embodiment, a multi-site distributed storage system includes a first cluster having a primary copy of data in a consistency group (CG1). The consistency group of the first cluster is assigned a master role. A second cluster has a mirror copy of the data of the primary copy in the consistency group. The consistency group of the second cluster (CG2) is assigned a slave role. An external mediator module is provisioned in a third site (mediator site) and a mediator agent is configured on both first and second storage clusters to act as an arbitrator towards handling of split brain scenarios and other failure cases including site failures.

At operation 610, a multi-site distributed storage system having the first and second clusters receives events for at least one consistency group with the events being associated with a continuity relationship for the first and second clusters of the multi-site distributed storage system. These events could be generated on either cluster or both clusters. At operation 612, the mediator agent coordinates these events—both multiple copies of a same event generated by each constituent or volume of the CG and also conflicting events generated simultaneously, to provide semantically correct outcome as defined by business continuity logic. In one example, the mediator agent coordinates the events of a first consistency group including a first event of a first volume of the first cluster and other events including a second event of a second volume of the second cluster that duplicates the first event or conflicts with the first event.

At operation 614, in response to or based on the coordination, events of the first consistency group are queued in a configuration database (e.g., replicated database (RDB) 512a, RDB 512b, configuration database 138, configuration database 148, configuration database 238, configuration database 248) which is consistent across all the storage nodes in the first cluster if the configuration database is located in the first cluster or the configuration database is consistent across all storage nodes in the second cluster if the configuration database is located in the second cluster.

In one example, at operation 616, a first event (e.g., oldest request for a first received event) is processed from a queue of the configuration database by a storage node that is located in a same cluster (e.g., first cluster, second cluster) as the configuration database. When the first event is being processed, a status is changed at operation 618 to indicate that the first event is being processed and none of the remaining events (e.g., tasks of mediator agent corresponding to the second event, third event, etc.) will be processed until processing of the first event is completed. At operation 619, the computer-implemented method includes caching an output of the processing of the first event in the configuration database. At operation 620, the computer-implemented method includes terminating, with the mediator agent, any event that duplicates with the first event for the first consistency group.

At operation 622, the mediator agent performs serialization of the events across all the nodes that share the cluster (e.g., first cluster, second cluster) with the configuration database. In one example, transactions of the configuration database are used for the serialization. At operation 624, the mediator agent performs serialization of the events across the first and second storage clusters. The mediator agent performs serialization of events including conflicting events to arrive at a consistent end state of the continuity relationship. In one example, the conflicting events are routed through a single site (e.g., single site having master role).

In one example, serialization occurs for events of a planned failover from the first cluster to the second cluster, specifically for the rollback event from master copy and role-change event from the slave copy. The distributed storage system can process the failover operation based on processing of the first event. If the role-change event is processed first, the second cluster converts the slave copy to master copy and the first cluster converts master copy to slave copy. If the rollback event is processed first the slave copy in the second cluster may be marked as failover incapable (FOIC).

In another example, the mediator agent implements a thread pool to process events for the first consistency group in parallel with processing events for a second consistency group.

There are some cases where both the first (primary) cluster and the second (secondary) cluster will try to modify a record of a mediator at the same time. For example, it is possible that a business continuity relationship state goes out of sync (OOS) immediately after the relationship state becomes in sync. Thus, the first cluster having a master role could be processing an OOS event and the second cluster having the slave role could process an in sync event. An out of order processing can result in inconsistent relationship state at a given time period and if not solved, can lead to automatic failover to a mirror copy of the second cluster, which may not be synchronized with the primary copy of the first cluster and thereby a data loss. The multi-site distributed storage system solves this issue by routing such conflicting events thru a single site storage system. In one example, the first cluster having the master role is chosen to handle the conflicting events. In this case, the mediator agent that is configured at the first cluster serializes these conflicting events to arrive at a consistent end state of the relationship.

Figure 7:
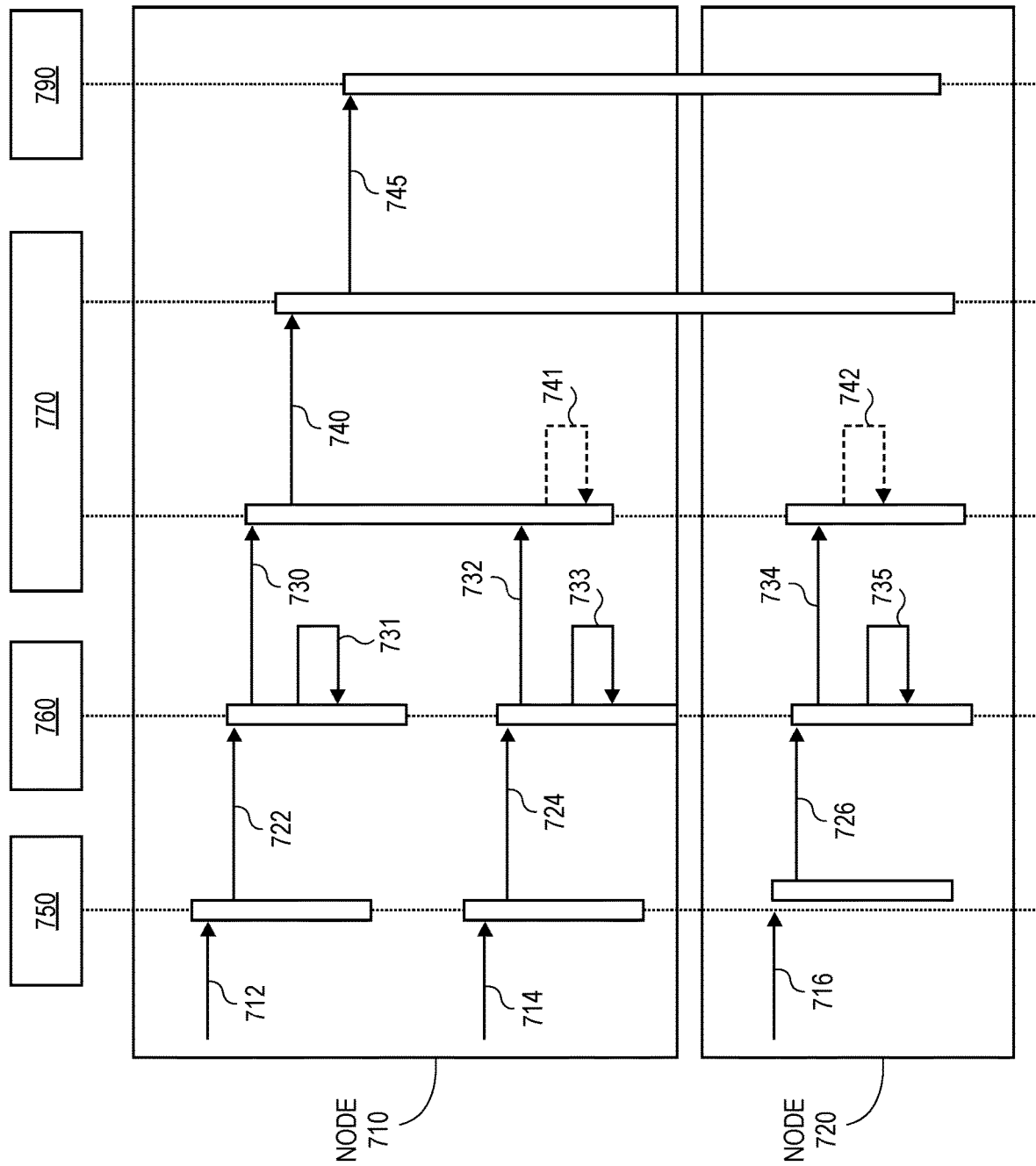
FIG. 7 is a flow diagram illustrating operations for deduplicating of events for a multi-site distributed storage system in accordance with an embodiment of the present disclosure.

FIG. 7 is a flow diagram illustrating operations for deduplicating of events for a multi-site distributed storage system in accordance with an embodiment of the present disclosure.

Although the operations are shown in a particular order, the order of the actions can be modified. Thus, the illustrated embodiments can be performed in a different order, and some operations may be performed in parallel. The numbering of the operations presented is for the sake of clarity and is not intended to prescribe an order of operations in which the various operations must occur. Additionally, operations from the various flows may be utilized in a variety of combinations.

The operations of FIG. 7 may be executed by a storage controller, a storage virtual machine (e.g., SVM 511a, SVM 511b), a mediator (e.g., mediator 120, mediator 220, mediator 360), a multi-site distributed storage system, a mediator agent configured on each cluster of a multi-site distributed storage system, a computer system, a machine, a server, a web appliance, a centralized system, a distributed node, or any system, which includes processing logic (e.g., a processor). The processing logic may include hardware (circuitry, dedicated logic, etc.), software (such as is run on a general purpose computer system or a dedicated machine or a device), or a combination of both.

In one embodiment, a multi-site distributed storage system includes a first cluster having a primary copy of data in a first consistency group. The first consistency group of the first cluster is assigned a master role. A second cluster has a mirror copy of data of the primary copy in the first consistency group. The CG of the second cluster is assigned a slave role.

A CG is designed to ensure that all the constituents (e.g., volumes, members) of a particular CG get consistent results while processing a particular event. The constituents (e.g., volumes, members) of a CG can spread across different nodes in a cluster and thus some of the attributes of the CG are stored at a constituent level. It is desirable that such attributes be consistent across all constituents. This is challenging due to having time delays for when different constituents receive various events. To maintain consistency, the mediator agent deduplicates requests from all the constituents and performs the processing only once. In one example, the processing is performed upon arrival of a first event from a constituent. The mediator agent then caches a result of the processing of the first event in a configuration database and terminates all same event from all other constituents with the same result/outcome. This also improves efficiency by avoiding multiple round-trips to an external mediator and thereby allow quicker I/O resumption.

For an alternative embodiment, a round-trip occurs from a storage cluster to an external mediator for each event that is associated with a constituent or a volume. However, this can result in multiple conflicting outcomes. For example, a storage virtual machine (SVM) may obtain a positive consensus on behalf of some constituents or volumes or whole other constituents or volumes continue waiting. However, the multiple conflicting outcomes increase the I/O resumption time for a CG that is made up of multiple constituents or volumes. A last constituent or volume to obtain a consensus would define an I/O resumption time.

FIG. 7 illustrates storage nodes 710 and 720 with each node generating simultaneous events during operations 712, 714, and 716. Each of these operations indicates an out of synch (OOS) event for a respective volume of a node. In one example, operation 712 indicates an OOS event for a first volume of node 710, operation 714 indicates the OOS event for a second volume of node 710, and operation 716 indicates the OOS event for a third volume of node 720. These events are duplicative of each other and a data plane 750 receives these events at the same time or nearly the same time. The events are associated with a continuity relationship for first and second clusters of the multi-site distributed storage system. In one example, the nodes 710 and 720 form a consistency group (CG) with node 710 being located at a first cluster (first site) with a first storage virtual machine (e.g., SVM 511a, SVM 511b) and node 720 being located at a second cluster (second site) with a second SVM. The SVM or other controlling entity, manage or contain the volume at issue, performing such actions on behalf of the volume.

A node operating system (OS) 760 receives operations 722, 724, and 726 having instructions to suspend operation of the CG due to the OOS events. Operations 731, 733, and 735 indicate the suspension of the CG. A mediator agent 770 having CG management receives operations 730, 732, and 734 for reporting the OOS events. At operation 740, the mediator agent 770 sends a report of the OOS event for the first volume of the first node to a mediator 790 (e.g., an external mediator at a third site). At operations 741 and 742, the OOS events for the second volume of the node 710 and the third volume of the node 720 are deduplicated and not forwarded to the mediator 790. The nodes 710 and 720 each have a mediator agent. The mediator 790 generates a response to send to the first and second volumes of node 710 and the third volume of node 720 based on receiving the report of the OOS event at operation 745.

In another example, if node 710 and node 720 are not in the same CG, then the OOS event from node 720 is not deduplicated. Instead, this event will be forwarded to the mediator 790.

The present design provides zero RPO protection of the continuity relationship between primary and secondary storage cluster even if a mediator at a third site is unavailable. The mediator agent ensures that there is no dependency on the external mediator with respect to zero RPO protection of the continuity relationship. The mediator agent enables OOS processing and serializes intercluster consensus event from a primary cluster and out of sync state from a secondary cluster, thereby guaranteed non-disruptiveness of I/O operations.

The mediator agent also enables an auto resync feature to resume zero RPO protection even in the absence of Mediator availability. An auto resync operation generates an in sync event upon completion of synchronization from a primary copy of data to a second copy of data to mark an end state as failover-capable. An out of sync (OOS) event can be generated by a data path without the knowledge of an auto resync operation and the mediator agent serializes the OOS event with an in sync event generated by the auto resync operation upon completion to arrive at the correct end state of OOS.

In one example, an in sync event arrives first and then an OOS event arrives, thus causing an end state to be OOS.

In another example, an OOS event arrives first and then an in sync event arrives. The mediator agent rejects the in sync event, thus causing an end state of OOS.

For scenarios where a relationship state has changed while the external mediator was unavailability, the mediator agent records the updated relationship state persistently in a record of a configuration database so that the mediator is taken thru a mediator reseed process and brought up to date with a latest continuity relationship state for a given CG, before the mediator is brought back into the quorum and automatic failover is possible.

The present design supports both active and passive versions of the mediator. Various models are available for building a third party quorum with two active copies of data from primary and second clusters and the mediator. The mediator can be an active process for monitoring continuity relationships and processing events or a passive entity like a database record.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or non-transitory computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 8:
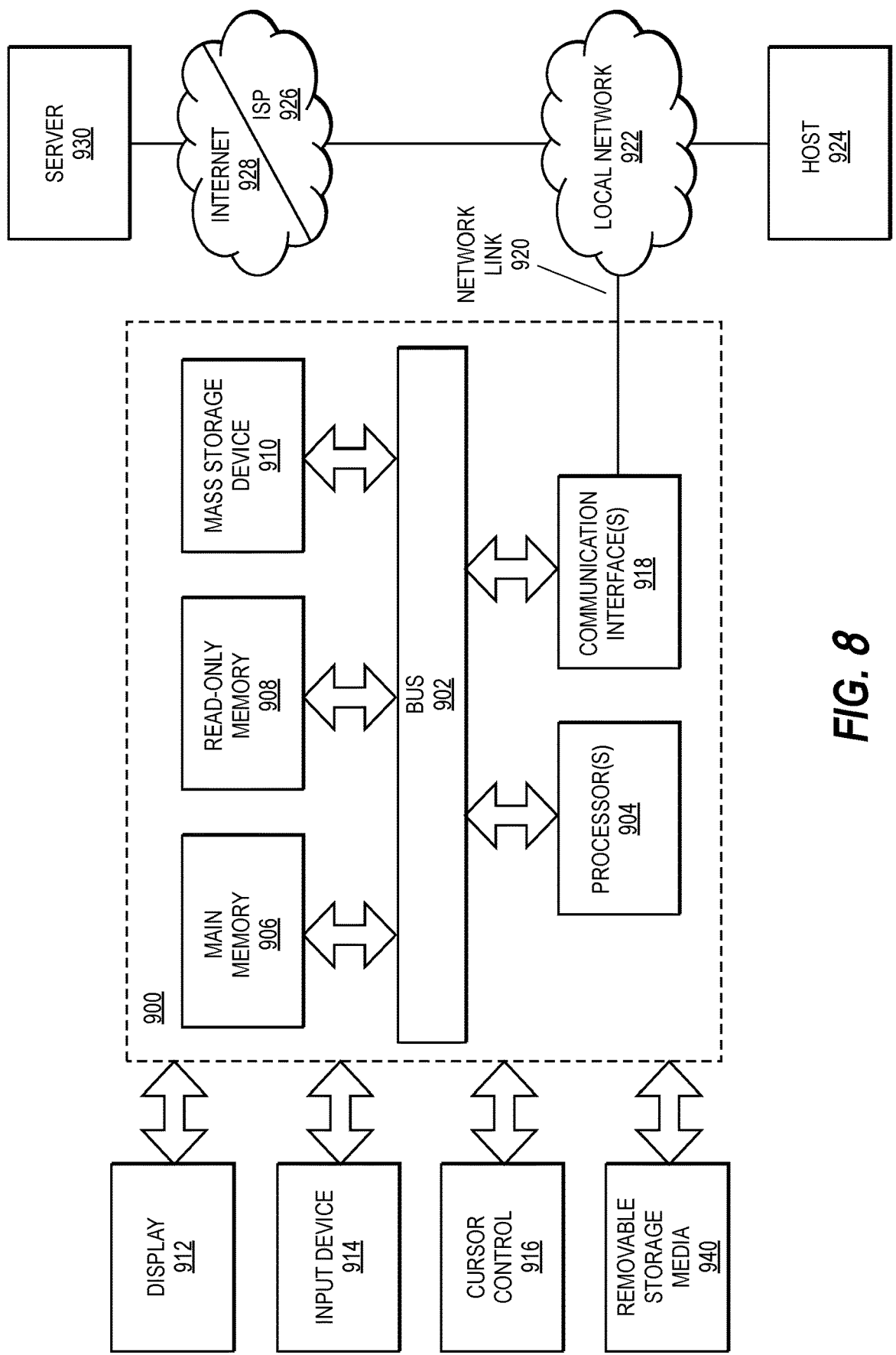
FIG. 8 illustrates an example computer system in which or with which embodiments of the present disclosure may be utilized.

FIG. 8 is a block diagram that illustrates a computer system 900 in which or with which an embodiment of the present disclosure may be implemented. Computer system 900 may be representative of all or a portion of the computing resources associated with a storage node (e.g., storage node 136a-n, storage node 146a-n, storage node 236a-n, storage node 246a-n, nodes 311-312, nodes 321-322, storage node 400, nodes 712, 714, 752, 754), a mediator (e.g., mediator 120, mediator 220, mediator 360), or an administrative work station (e.g., computer system 110, computer system 210). Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., processing logic, hardware processor(s) 904) coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media. Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

What is claimed is:

1. A computer-implemented method performed by one or more processing resources of a first cluster of a multi-site distributed storage system, the computer-implemented method comprising:
    coordinating, with a mediator agent, events including a first event of a first member of the first cluster and a second event of a second member of the first cluster or of a second cluster with the second event duplicating the first event; and
    terminating, with the mediator agent, the second event that duplicates the first event.

2. The computer-implemented method of claim 1, further comprising:
    receiving the events that are associated with a continuity relationship for a primary copy of data of the first cluster and a mirror copy of the data of the second cluster of the multi-site distributed storage system.

3. The computer-implemented method of claim 1, further comprising:
    queuing the events including the first event, the second event, and a third event in a configuration database of the first cluster or the second cluster with the configuration database being consistent across storage nodes having members in the first cluster or the second cluster.

4. The computer-implemented method of claim 3, further comprising:
    processing the first event from a queue of the configuration database while none of the second and third events will be processed until processing of the first event is completed;
    changing a status of the first event being processed to indicate that the first event is being processed; and
    caching an output of the processing of the first event in the configuration database.

5. The computer-implemented method of claim 1, further comprising:
    performing, with the mediator agent, serialization of multiple events across storage nodes of the first or second cluster using transactions of a configuration database.

6. The computer-implemented method of claim 1, further comprising:
    provisioning an external mediator as an active process for monitoring continuity relationships and processing events or provisioning the external mediator as a passive entity, wherein the external mediator is located on a storage site that is external from the first and second clusters.

7. The computer-implemented method of claim 1, wherein the mediator agent of the first cluster supports provides coordination and serialization for lifecycle operations and zero recovery point objective (RPO) protection related events for the first cluster and the second cluster even if an external mediator is not available with the external mediator being located on a storage site that is external to the first and second clusters.

8. A multi-site distributed storage system comprising:
    one or more processing resources; and
    a non-transitory computer-readable medium coupled to the one or more processing resources, having stored therein instructions, which when executed by the one or more processing resources cause the one or more processing resources to:
    coordinating, with a mediator agent, events including a first event of a first member of the first cluster and a second event of a second member of the first cluster or of a second cluster with the second event duplicating the first event; and
    terminating, with the mediator agent, the second event that duplicates the first event.

9. The multi-site distributed storage system of claim 8, wherein the instructions when executed by the one or more processing resources cause the one or more processing resources to:
    receiving the events that are associated with a continuity relationship for a primary copy of data of the first cluster and a mirror copy of the data of the second cluster of the multi-site distributed storage system.

10. The multi-site distributed storage system of claim 8, wherein the instructions when executed by the one or more processing resources cause the one or more processing resources to:
    queuing the events including the first event, the second event, and a third event in a configuration database of the first cluster or the second cluster with the configuration database being consistent across storage nodes having members in the first cluster or the second cluster.

11. The multi-site distributed storage system of claim 10, wherein the instructions when executed by the one or more processing resources cause the one or more processing resources to:
    processing the first event from a queue of the configuration database while none of the second and third events will be processed until processing of the first event is completed;
    changing a status of the first event being processed to indicate that the first event is being processed; and
    caching an output of the processing of the first event in the configuration database.

12. The multi-site distributed storage system of claim 8, wherein the instructions when executed by the one or more processing resources cause the one or more processing resources to:
    performing, with the mediator agent, serialization of multiple events across storage nodes of the first or second cluster using transactions of a configuration database.

13. The multi-site distributed storage system of claim 8, wherein the instructions when executed by the one or more processing resources cause the one or more processing resources to:
    provisioning an external mediator as an active process for monitoring continuity relationships and processing events or provisioning the external mediator as a passive entity, wherein the external mediator is located on a storage site that is external from the first and second clusters.

14. The multi-site distributed storage system of claim 8, wherein the mediator agent of the first cluster provides coordination and serialization for lifecycle operations and zero recovery point objective (RPO) protection related events for the first cluster and the second cluster even if an external mediator is not available with the external mediator being located on a storage site that is external to the first and second clusters.

15. A non-transitory computer-readable storage medium embodying a set of instructions, which when executed by one or more processing resources of a multi-site distributed storage system cause the one or more processing resources to:

coordinate, with a mediator agent, events including a first event of a first member of the first cluster and a second event of a second member of the first cluster or of a second cluster with the second event duplicating the first event; and terminate, with the mediator agent, the second event that duplicates the first event.

16. The non-transitory computer-readable storage medium of claim 15, wherein the instructions when executed by the one or more processing resources cause the one or more processing resources to:

receive the events that are associated with a continuity relationship for a primary copy of data of the first cluster and a mirror copy of the data of the second cluster of the multi-site distributed storage system.

17. The non-transitory computer-readable storage medium of claim 16, wherein the instructions when executed by the one or more processing resources cause the one or more processing resources to:

process the first event from a queue of the configuration database while none of the second and third events will be processed until processing of the first event is completed;

change a status of the first event being processed to indicate that the first event is being processed; and cache an output of the processing of the first event in the configuration database.

18. The non-transitory computer-readable storage medium of claim 15, wherein the instructions when executed by the one or more processing resources cause the one or more processing resources to:

queue the events including the first event, the second event, and a third event in a configuration database of the first cluster or the second cluster with the configuration database being consistent across storage nodes having members in the first cluster or the second cluster.

19. The non-transitory computer-readable storage medium of claim 15, wherein the instructions when executed by the one or more processing resources cause the one or more processing resources to:

perform, with the mediator agent, serialization of multiple events across storage nodes of the first or second cluster using transactions of a configuration database.

20. The non-transitory computer-readable storage medium of claim 15, wherein the instructions when executed by the one or more processing resources cause the one or more processing resources to:

provision an external mediator as an active process for monitoring continuity relationships and processing events or provision the external mediator as a passive entity, wherein the external mediator is located on a storage site that is external from the first and second clusters.

* * * * *